United States Patent
Xue et al.

(10) Patent No.: US 11,368,979 B2
(45) Date of Patent: Jun. 21, 2022

(54) SYNCHRONOUS CHANNEL ACCESS BASED ON ADAPTIVE CHANNEL OCCUPANCY TIME MANAGEMENT

(71) Applicant: QUALCOMM Incorporated, San Diego, CA (US)

(72) Inventors: Yisheng Xue, San Diego, CA (US); Aleksandar Damnjanovic, Del Mar, CA (US); Xiaoxia Zhang, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 16/953,097

(22) Filed: Nov. 19, 2020

(65) Prior Publication Data

US 2021/0243800 A1  Aug. 5, 2021

Related U.S. Application Data

(60) Provisional application No. 62/968,079, filed on Jan. 30, 2020.

(51) Int. Cl.
*H04W 74/00* (2009.01)
*H04W 74/08* (2009.01)
*H04W 16/14* (2009.01)

(52) U.S. Cl.
CPC ......... *H04W 74/008* (2013.01); *H04W 16/14* (2013.01); *H04W 74/0816* (2013.01); *H04W 74/0891* (2013.01)

(58) Field of Classification Search
CPC .............. H04W 16/14; H04W 74/008; H04W 74/0808; H04W 74/0816; H04W 74/0891
See application file for complete search history.

(56) References Cited

U.S. PATENT DOCUMENTS

| | | | |
|---|---|---|---|
| 2017/0339530 A1* | 11/2017 | Maaref | H04L 5/0055 |
| 2020/0281027 A1* | 9/2020 | Damnjanovic | H04W 16/14 |
| 2021/0204232 A1* | 7/2021 | Damnjanovic | H04W 56/001 |
| 2022/0039016 A1* | 2/2022 | Terry | H04W 74/0808 |

\* cited by examiner

*Primary Examiner* — Kashif Siddiqui
(74) *Attorney, Agent, or Firm* — QUALCOMM Incorporated (57) ABSTRACT

Various aspects of the present disclosure generally relate to wireless communication. In some aspects, a node may identify a listen-before-talk (LBT) success time at which an LBT procedure, performed by the node, succeeds; determine a lag between the LBT success time and a most recent synchronization reference boundary that occurred prior to the LBT success time; and determine a maximum channel occupancy time for transmissions on an unlicensed radio frequency spectrum band based at least in part on comparing the lag and a threshold. Numerous other aspects are provided.

20 Claims, 6 Drawing Sheets

SYNCHRONOUS CHANNEL ACCESS BASED ON ADAPTIVE CHANNEL OCCUPANCY TIME MANAGEMENT

CROSS-REFERENCE TO RELATED APPLICATION

This Patent Application claims priority to U.S. Provisional Patent Application No. 62/968,079, filed on Jan. 30, 2020, entitled "SYNCHRONOUS CHANNEL ACCESS BASED ON ADAPTIVE CHANNEL OCCUPANCY TIME MANAGEMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for synchronous channel access based on adaptive channel occupancy time management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a node, may include identifying a listen-before-talk (LBT) success time at which an LBT procedure, performed by the node, succeeds; determining a lag between the LBT success time and a most recent synchronization reference boundary that occurred prior to the LBT success time; and determining a maximum channel occupancy time (MCOT) for transmissions on an unlicensed radio frequency spectrum band based at least in part on comparing the lag and a threshold.

In some aspects, a method of wireless communication, performed by a node, may include generating a random number associated with determining an MCOT for a transmission on an unlicensed radio frequency spectrum band; comparing the random number and a threshold; and determining the MCOT based at least in part on comparing the random number and the threshold.

In some aspects, a node for wireless communication may include memory and one or more processors operatively coupled to the memory. The memory and the one or more processors may be configured to identify an LBT success time at which an LBT procedure, performed by the node, succeeds; determine a lag between the LBT success time and a most recent synchronization reference boundary that occurred prior to the LBT success time; and determine an MCOT for transmissions on an unlicensed radio frequency spectrum band based at least in part on comparing the lag and a threshold.

In some aspects, a node for wireless communication may include memory and one or more processors operatively coupled to the memory. The memory and the one or more processors may be configured to generate a random number associated with determining an MCOT for a transmission on an unlicensed radio frequency spectrum band; compare the random number and a threshold; and determine the MCOT based at least in part on comparing the random number and the threshold.

In some aspects, a non-transitory computer-readable medium may store one or more instructions for wireless communication. The one or more instructions, when executed by one or more processors of a node, may cause the one or more processors to: identify an LBT success time at which an LBT procedure, performed by the node, succeeds; determine a lag between the LBT success time and a most recent synchronization reference boundary that occurred prior to the LBT success time; and determine an MCOT for transmissions on an unlicensed radio frequency spectrum band based at least in part on comparing the lag and a threshold.

In some aspects, a non-transitory computer-readable medium may store one or more instructions for wireless communication. The one or more instructions, when executed by one or more processors of a node, may cause the one or more processors to: generate a random number associated with determining an MCOT for a transmission on an unlicensed radio frequency spectrum band; compare the random number and a threshold; and determine the MCOT based at least in part on comparing the random number and the threshold.

In some aspects, an apparatus for wireless communication may include means for identifying an LBT success time at which an LBT procedure, performed by the apparatus, succeeds; means for determining a lag between the LBT success time and a most recent synchronization reference boundary that occurred prior to the LBT success time; and means for determining an MCOT for transmissions on an unlicensed radio frequency spectrum band based at least in part on comparing the lag and a threshold.

In some aspects, an apparatus for wireless communication may include means for generating a random number associated with determining an MCOT for a transmission on an unlicensed radio frequency spectrum band; means for comparing the random number and a threshold; and means for determining the MCOT based at least in part on comparing the random number and the threshold.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. An apparatus may be implemented, or a method may be practiced, using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
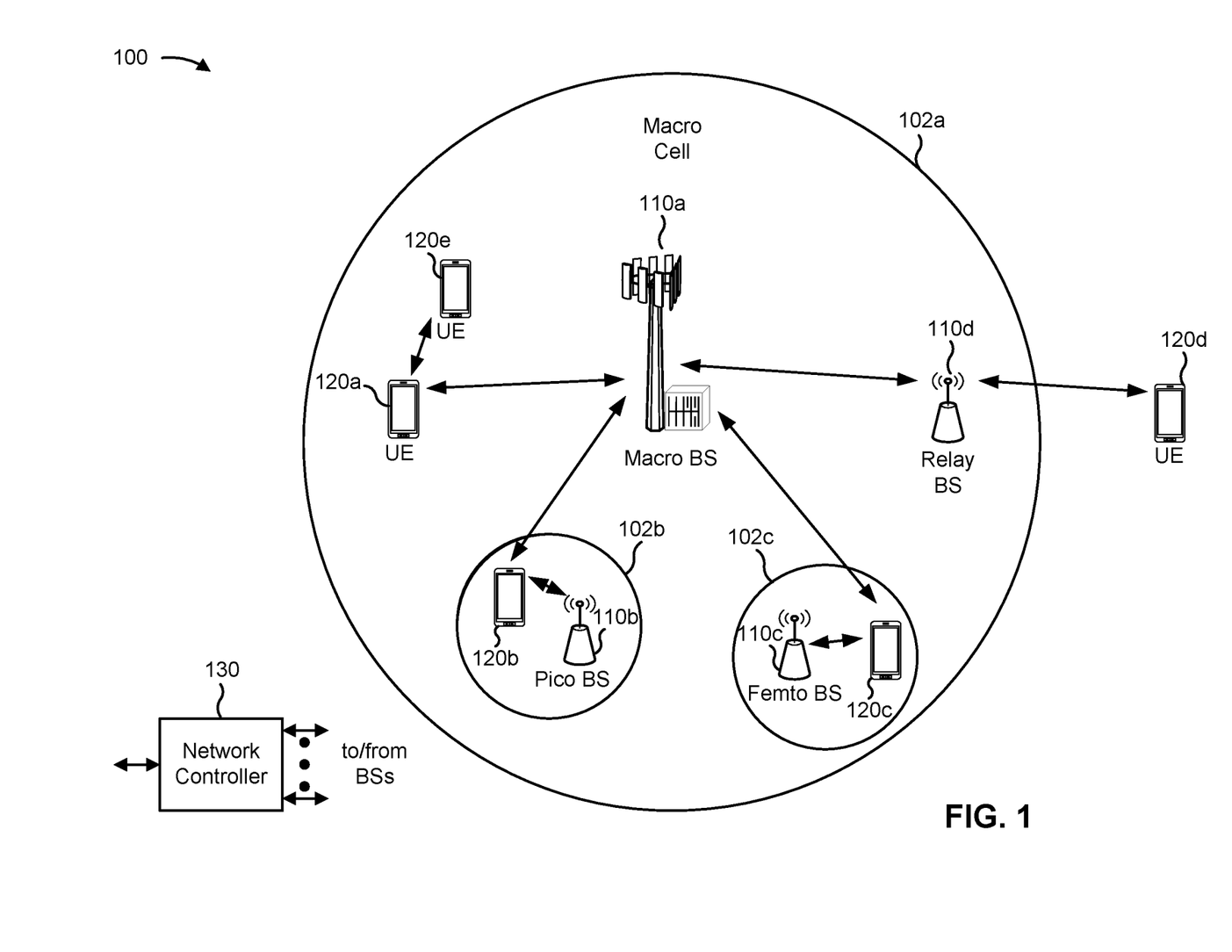
FIG. 1 is a block diagram conceptually illustrating an aspect of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. In some aspects, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, a node, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a Wi-Fi station, a Wi-Fi-access point, or any other suitable device that is configured to communicate via a wireless or wired medium.

Some UEs may be considered machine-type communication (MTC) or evolved or enhanced machine-type communication (eMTC) UEs. MTC and eMTC UEs include robots, drones, remote devices, sensors, meters, monitors, location tags, and/or the like, that may communicate with a base station, another device (e.g., remote device), or some other entity. A wireless node may provide connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed. "Node" may refer to any UE, base station, or other device that is configured to communicate using an unlicensed frequency spectrum band, a cellular network, and/or the like.

In some aspects, two or more UEs 120 (e.g., shown as UE 120a and UE 120e) may communicate directly using one or more sidelink channels (e.g., without using a base station 110 as an intermediary to communicate with one another). The UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an aspect. Other aspects may differ from what is described with regard to FIG. 1.

Figure 2:
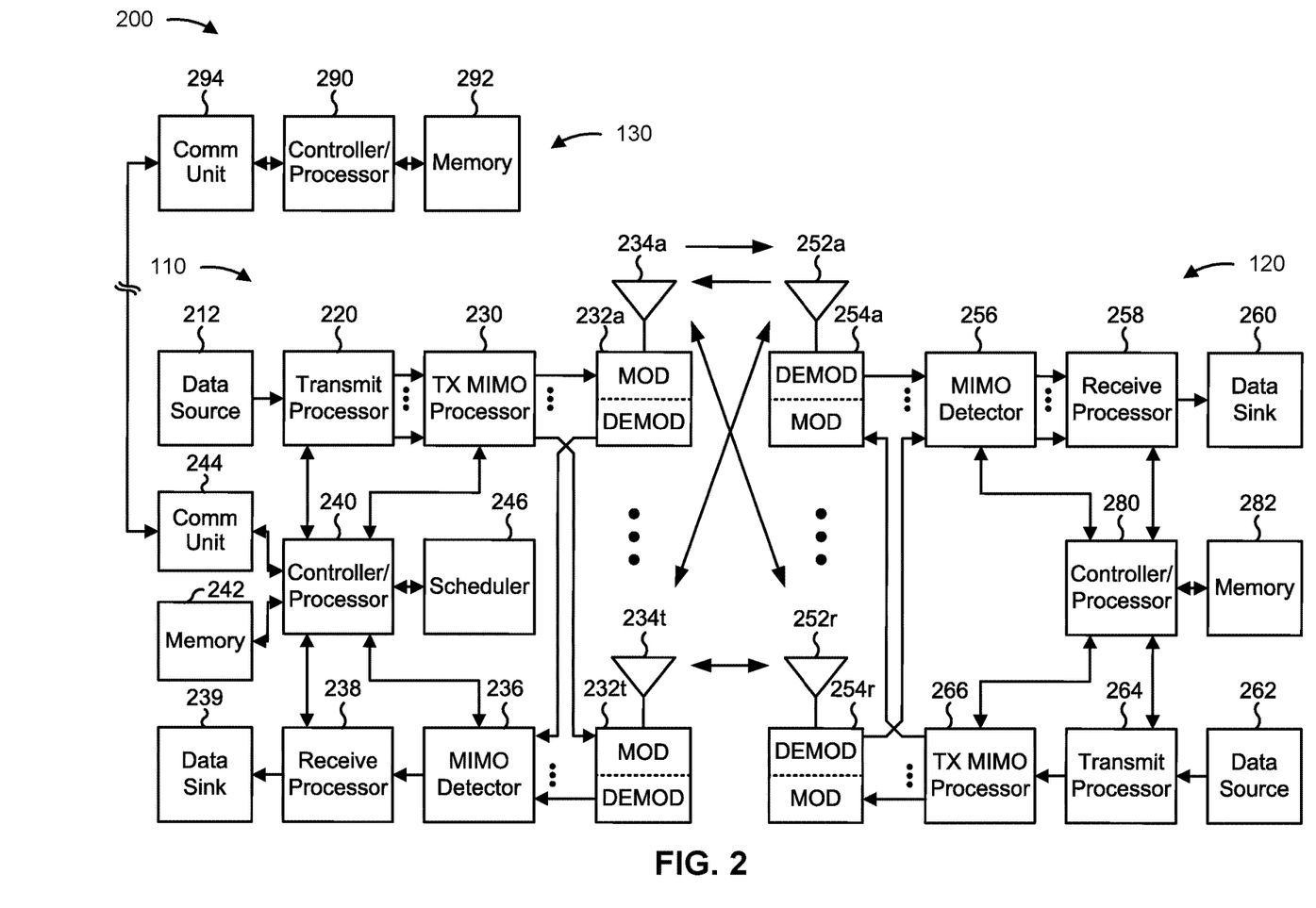
FIG. 2 is a block diagram conceptually illustrating an aspect of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with synchronous channel access based on adaptive channel occupancy time management, as described in more detail elsewhere herein. In some aspects, controller/processor 240 of base station 110, controller/processor 280 of UE 120, and/or any other component(s) of FIG. 2 may perform or direct operations of process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. The one or more instructions, when executed by one or more processors of the base station 110 and/or the UE 120, may perform or direct operations of process 500 of FIG. 5, process 600 of FIG. 6, and/or other processes as described herein. A scheduler 246 may schedule UEs for data transmission on the downlink and/or uplink.

In some aspects, a node (e.g., a BS 110, a UE 120, and/or the like) may include means for identifying a listen-before-talk (LBT) success time at which an LBT procedure, performed by the node, succeeds, means for determining a lag between the LBT success time and a most recent synchronization reference boundary that occurred prior to the LBT success time, means for determining a maximum channel occupancy time (MCOT) for transmissions on an unlicensed radio frequency spectrum band based at least in part on comparing the lag and a threshold, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, node (e.g., a BS 110, a UE 120, and/or the like) may include means for generating a random number associated with determining an MCOT for a transmission on an unlicensed radio frequency spectrum band, means for comparing the random number and a threshold, means for determining the MCOT based at least in part on comparing the random number and the threshold, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an aspect. Other aspects may differ from what is described with regard to FIG. 2.

Some aspects described herein related to an unlicensed radio frequency spectrum band, which may be used for communications in a wireless network, such as wireless network 100. In some aspects, the unlicensed radio frequency spectrum band may be used by base stations 110 and UEs 120 of a cellular network for cellular communications (e.g., NR communications), and by Wi-Fi access points and Wi-Fi stations of a Wi-Fi network for Wi-Fi communications. The unlicensed radio frequency spectrum band may be used in the cellular network in combination with, or independent from, a licensed radio frequency spectrum band. In some examples, the unlicensed radio frequency spectrum band may be a radio frequency spectrum band for which a device may need to contend for access because the radio frequency spectrum band is available, at least in part, for unlicensed use, such as Wi-Fi use.

Prior to gaining access to, and communicating over, an unlicensed radio frequency spectrum band, a node may perform a listen-before-talk (LBT) procedure to contend for access to the unlicensed radio frequency spectrum band. An LBT procedure, sometimes referred to as a clear channel assessment (CCA) procedure, may include performing a CCA to determine whether a channel of the unlicensed radio frequency spectrum band is available. When it is determined that the channel of the unlicensed radio frequency spectrum band is not available (e.g., because another apparatus is already using the channel of the unlicensed radio frequency spectrum band), a CCA procedure may be performed for the channel again at a later time. In environments in which a node may be starved of access to a channel of an unlicensed radio frequency spectrum band due to Wi-Fi activity, an extended CCA procedure may be employed to increase the likelihood that the node will successfully contend for access to the channel of the unlicensed radio frequency spectrum band. An extended CCA procedure involves the performance of a random number of CCA procedures (from 1 to q), in accordance with an extended CCA counter.

Regardless of whether a single CCA procedure is performed or multiple CCA procedures are performed, each CCA procedure may include detecting or sensing an energy level on the channel of the unlicensed radio frequency spectrum band and determining whether the energy level is below a threshold. When the energy level is below the threshold, the CCA procedure is successful and contention to access the channel of the unlicensed radio frequency spectrum band may be successful. When the energy level exceeds the threshold, the CCA procedure is unsuccessful and contention to access the channel of the unlicensed radio frequency spectrum band may be unsuccessful.

When a CCA procedure or extended CCA procedure is successful, a transmission may be made over the channel of the unlicensed radio frequency spectrum band. When a packet error is encountered (e.g., due to a collision of transmissions made by two or more transmitting apparatuses, or due to poor channel conditions), a hybrid automatic repeat request (HARQ)-based retransmission may be performed. In some aspects, the retransmission may be modified from the original transmission using rate adaptation (e.g., based at least in part on a channel quality indicator (CQI) reported by a UE).

Example LBT categories include category one (Cat 1) LBT, category two (Cat 2) LBT, category three (Cat 3) LBT, and category four (Cat 4) LBT. In Cat 1 LBT, also referred to as no LBT, an LBT procedure is not performed prior to transmission of a communication on the channel. In Cat 2 LBT, the channel sensing duration is fixed (e.g., without random back-off). A 16 microsecond channel sensing duration is used for 16 microsecond Cat 2 LBT, and a 25 microsecond channel sensing duration is used for 25 microsecond Cat 2 LBT. In Cat 3 LBT, the channel sensing duration is fixed (e.g., a contention window has a fixed size), and random back-off is used. In Cat 4 LBT, the channel sensing duration is variable (e.g., a contention window has a variable size), and random back-off is used.

Synchronous channel access may be configured to maintain a particular maximum channel occupancy time (MCOT) for each device accessing the channel. Each device accessing the channel may be required to adhere to an MCOT of 6 milliseconds (ms). Access to a common clock (e.g., Coordinated Universal Time, and/or the like) by each device may facilitate synchronous channel access by enabling devices to utilize synchronization reference boundaries for establishing MCOT. However, utilizing a constant, fixed MCOT may result in decreased quality of service (QoS) due to different timing needs of different types of communications.

According to various aspects described herein, nodes may use synchronous channel access based on adaptive channel occupancy time management, in which a node may determine a time-varying MCOT based at least in part on an LBT success time at which an LBT procedure, performed by the node, succeeds. The node may determine a lag between the LBT success time and a most recent synchronization reference boundary that occurred prior to the LBT success time. The lag may be compared to a threshold to determine the MCOT. By using the threshold as a tuning parameter to achieve a specified MCOT or average MCOT, some aspects of the synchronous channel access techniques described herein may enable better QoS for each node, while maintaining fairness between multiple nodes attempting to access the unlicensed frequency spectrum band.

Figure 3:
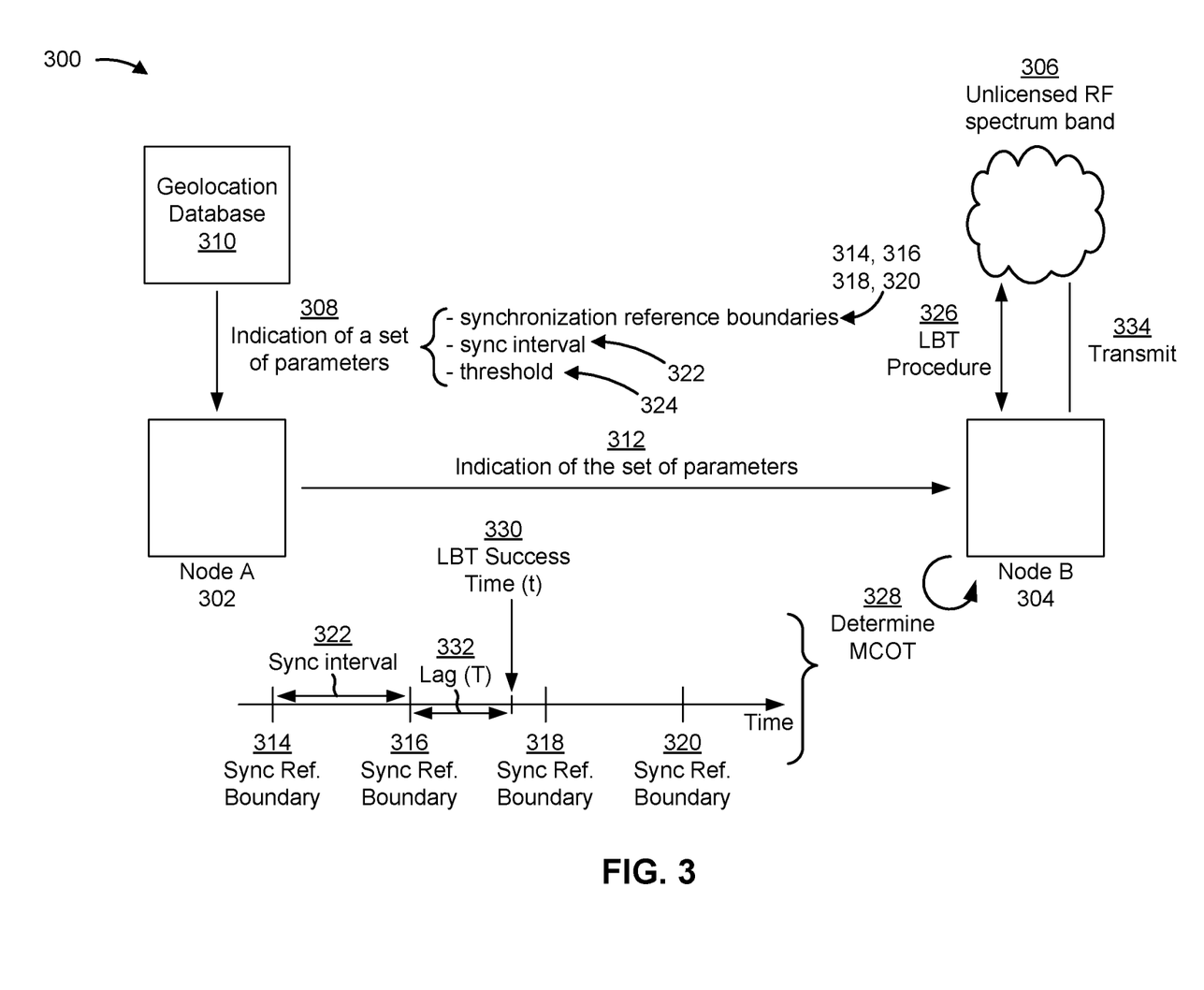
FIGS. 3 and 4 are diagrams illustrating aspects of synchronous channel access, in accordance with various aspects of the present disclosure.

FIG. 3 is a diagram illustrating an aspect 300 of synchronous channel access, in accordance with various aspects of the present disclosure.

As shown in FIG. 3, a node A 302 and a node B 304 may communicate with one another. Node A 302 and/or node B 304 may include devices (e.g., BSs 110, UEs 120, and/or the like) configured to communicate via an unlicensed radio frequency spectrum band 306, a cellular network, and/or the like.

As shown by reference number 308, node A 302 may receive an indication of a set of parameters from a geolocation database 310 (interchangeably referred to as an "Automated Frequency Coordination (AFC)" device and/or function). As shown by reference number 312, node A 302 may transmit, and node B 304 may receive, an indication of the set of parameters. The set of parameters may be indicated in system information (SI), remaining minimum system information (RMSI), a medium access control (MAC) control element (CE), and/or the like. In some aspects, the node B 304 may transmit, to another node, an indication of the set of parameters.

The set of parameters may indicate a plurality of synchronization reference boundaries 314, 316, 318, and 320; one or more synchronization intervals 322 (e.g., the time period between two consecutive synchronization reference boundaries 314 and 316); a threshold 324; and/or the like. The synchronization reference boundaries 314, 316, 318, and 320 may be based on a common clock (e.g., UTC).

As shown by reference number 326, the node B 304 may perform an LBT procedure to access the unlicensed radio frequency spectrum band 306. In some aspects, the node B 304 may perform a Cat 4 LBT procedure. As shown by reference number 328, if the LBT procedure is successful, the node B 304 may determine the MCOT.

As shown, the node B 304 may identify a listen-before-talk (LBT) success time ("t") 330 at which the LBT procedure succeeds. The node B 304 may determine a lag ("τ") 332 between the LBT success time 330 and a most recent synchronization reference boundary 316 that occurred prior to the LBT success time 330.

The node B 304 may determine the MCOT for transmissions on the unlicensed radio frequency spectrum band 306 based at least in part on comparing the lag 332 and the threshold 324. In some aspects, if the lag 332 satisfies the threshold 324 (e.g., is less than the threshold 324, is less than or equal to the threshold 324, and/or the like), the MCOT may include a time period that terminates at a first synchronization reference boundary 318 occurring after the LBT success time 330. If the lag does not satisfy the threshold 324

(e.g., is greater than the threshold 324, is greater than or equal to the threshold 324, and/or the like), the MCOT may include a time period that terminates at a second synchronization reference boundary 320 occurring after the LBT success time 330.

In some aspects, the threshold may be fixed. The threshold may have a fixed value of lower than 2 milliseconds (ms) (e.g., 500 microseconds (μs), and/or the like), greater than 2 ms, and/or the like. In some aspects, as explained further below in connection with FIG. 4, the threshold may be variable.

In some aspects, the node B 304 may determine the MCOT without determining the lag 332. In some aspects, the node B 304 may use a random number generator to generate a random number associated with determining an MCOT for a transmission on the unlicensed radio frequency spectrum band 306. The random number may be a number between 0 and 1. In embodiments, the node B 304 may reuse a random number generator used for performing a CAT 4 LBT procedure, thereby reducing a processing cost for implementation.

The node B 304 may compare the random number and the threshold 324. The node B 304 may determine the MCOT based at least in part on comparing the random number and the threshold 324. In some aspects, if the random number satisfies the threshold 324 (e.g., is less than the threshold 324), the MCOT may include a time period that terminates at a first synchronization reference boundary 318 occurring after the LBT success time 330. If the random number does not satisfy the threshold 324 (e.g., is greater than the threshold 324), the MCOT may include a time period that terminates at a second synchronization reference boundary 320 occurring after the LBT success time 330.

As is further shown by reference number 334, the node B 304 may transmit on the unlicensed radio frequency spectrum band 306 during a time interval defined by the LBT success time 330 and the MCOT. According to various aspects described above, the node B 304 may determine a time varying MCOT based at least in part on an LBT success time 330 at which an LBT procedure, performed by the node B 304, succeeds. By using the threshold as a tuning parameter to achieve a specified MCOT or average MCOT, some aspects of the synchronous channel access techniques described herein may enable better QoS for each node, while maintaining fairness between multiple nodes attempting to access the unlicensed frequency spectrum band. Some aspects of the techniques for using a comparison of a random number to a threshold for determining MCOT, discussed above, may enable simplified configuration signaling, as the threshold may be able to be modified (as described below in connection with FIG. 4) without needing to determine the length of a synchronization interval.

As indicated above, FIG. 3 is provided as an aspect. Other aspects may differ from what is described with respect to FIG. 3.

Figure 4:
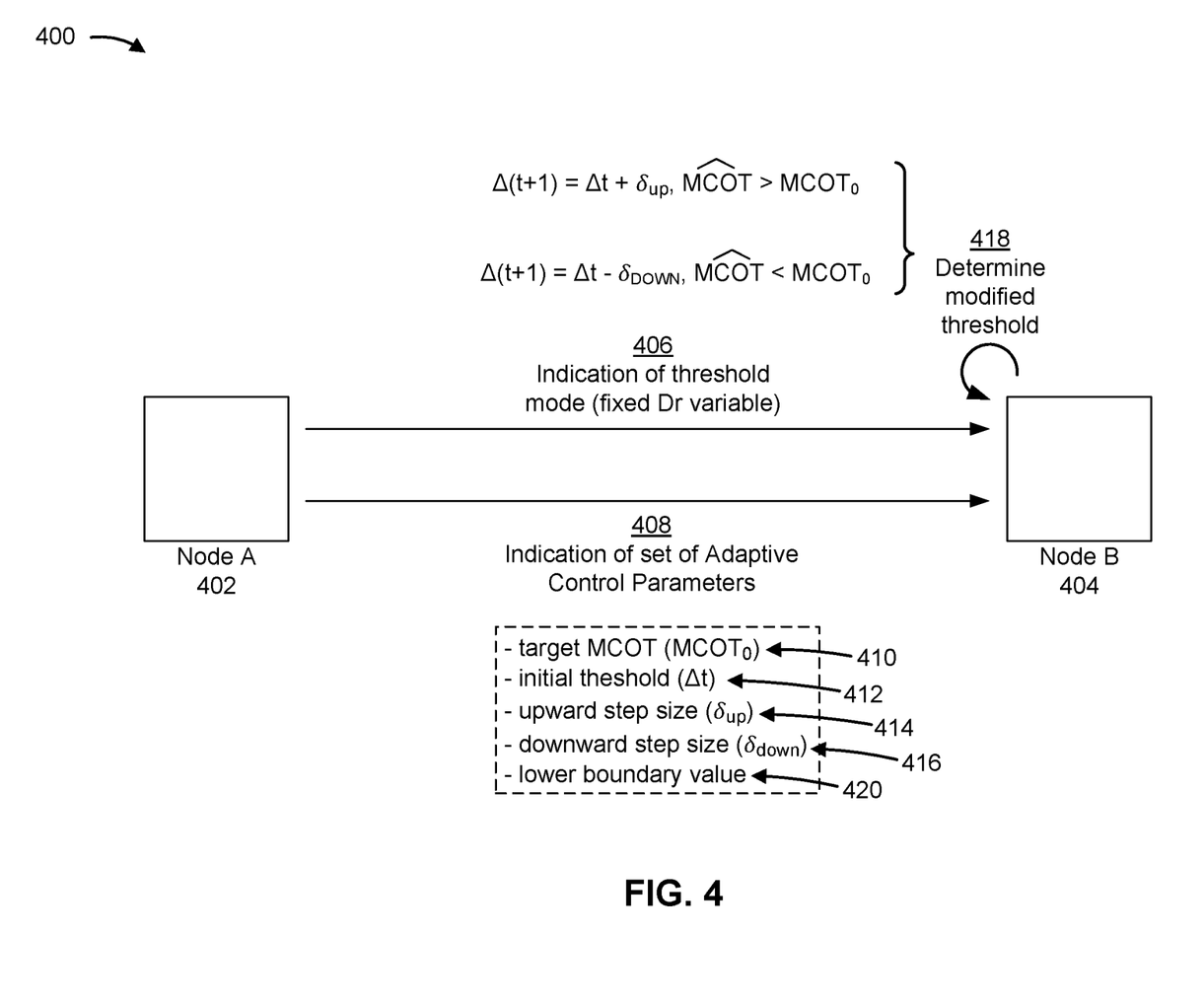

FIG. 4 is a diagram illustrating an aspect 400 of synchronous channel access, in accordance with various aspects of the present disclosure. As shown in FIG. 4, a node A 402 and a node B 404 may communicate with one another. In some aspects, the node A 402 and the node B 404 may be, or be similar to, the node A 302 and the node B 304 shown in FIG. 3.

As shown by reference number 406, the node A 402 may transmit, and the node B 404 may receive, a threshold mode indication that indicates a threshold mode, of a plurality of threshold modes, to be used for determining a threshold for use in determining an MCOT. In some aspects, the plurality of threshold modes includes a fixed threshold mode in which the threshold is fixed and a variable threshold mode in which the threshold is variable. In this way, a node A 402 may transmit an indication to activate and/or deactivate a variable threshold mode of operation by a node B 404.

The threshold mode may be indicated using one bit transmitted in system information (SI), remaining minimum system information (RMSI), a medium access control (MAC) control element (CE), or a combination thereof. In some aspects, the threshold mode may be implicitly indicated by the presence of an indication of a set of adaptive control parameters and/or other parameters related to determining MCOT.

As shown by reference number 408, the node A 402 may transmit, and the node B 404 may receive, an indication of a set of adaptive control parameters. The adaptive control parameters may indicate a target MCOT ($MCOT_0$) 410, an initial threshold ($\Delta t$) 412, an upward step size ($\delta_{up}$) 414, a downward step size ($\delta_{down}$) 416, or a combination thereof. In some aspects, the node A 402 may receive the set of adaptive control parameters from a geolocation database (e.g., the geolocation database 310 shown in FIG. 3).

As shown by reference number 418, the node B 404 may dynamically modify a value of the threshold based at least in part on an adaptive control procedure associated with a target MCOT ($MCOT_0$) 410. In some aspects, the node B 404 may perform the adaptive control procedure by determining an estimated average MCOT ($\overline{MCOT}$) and comparing the estimated average MCOT ($\overline{MCOT}$) and the target MCOT ($MCOT_0$) 410. The node B 404 may determine the estimated average MCOT ($\overline{MCOT}$) using a one-order infinite impulse response (IIR) filter with a specified alpha value. In some aspects, the node B 404 may determine the estimated average MCOT ($\overline{MCOT}$) using a moving average within a specified time window (e.g., the preceding one second, and/or the like).

In some aspects, the node B 404 may receive, from the node A 402, an indication of a procedure for determining the estimated average MCOT. The node A 402 may receive an indication of the procedure for determining the estimated average MCOT from a geolocation database (e.g., the geolocation database 310 shown in FIG. 3). The indication of the procedure for determining the estimated average MCOT may be transmitted in system information (SI), remaining minimum system information (RMSI), a medium access control (MAC) control element (CE), or a combination thereof.

The node B 404 may determine the modified threshold by modifying the initial threshold ($\Delta t$) 412 based at least in part on comparing the estimated average MCOT ($\overline{MCOT}$) and the target MCOT ($MCOT_0$) 410. As shown in FIG. 4, determining the modified threshold may include increasing the initial threshold ($\Delta t$) 412 by the upward step size ($\delta_{up}$) 414 if the estimated average MCOT ($\overline{MCOT}$) is greater than the target MCOT ($MCOT_0$) 410. Determining the modified threshold may include own, decreasing the initial threshold ($\Delta t$) 412 by the downward step size ($\delta_{down}$) 416 if the estimated average MCOT ($\overline{MCOT}$) is less than the target MCOT ($MCOT_0$) 410.

In some aspects, the indication of the set of adaptive control parameters may indicate a lower boundary value 420 for the threshold. The modified threshold may be greater than or equal to the lower boundary value 420. The lower boundary value may be indicated by the indication of the set of adaptive control parameters.

As indicated above, by using the threshold as a tuning parameter to achieve a specified MCOT or average MCOT, some aspects of the synchronous channel access techniques described herein may enable better QoS for each node, while maintaining fairness between multiple nodes attempting to access the unlicensed frequency spectrum band. Some aspects of the adaptive control loop described above for dynamically modifying the threshold may enable improved efficiency in access of unlicensed bands by enabling a system of devices to maintain an average MCOT at a specified range, while allowing for the MCOT associated with any given transmission to be flexible to accommodate different types and/or durations of transmissions.

As indicated above, FIG. 4 is provided as an example. Other examples may differ from what is described with respect to FIG. 4.

Figure 5:
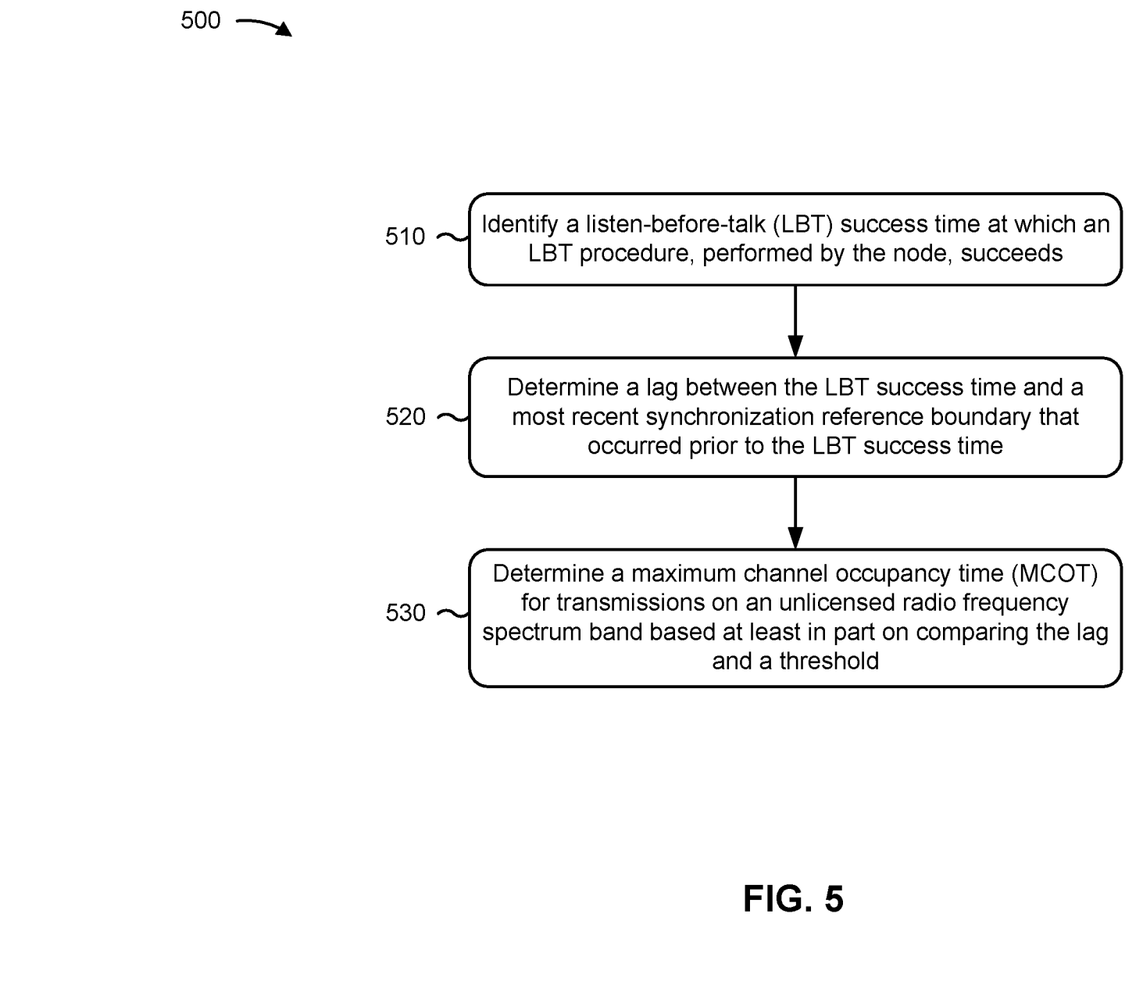
FIG. 5 is a diagram illustrating a process performed by a node, in accordance with various aspects of the present disclosure.

FIG. 5 is a diagram illustrating an example process 500 performed by a node, in accordance with various aspects of the present disclosure. Example process 500 is an example where the node (e.g., node B 304 and/or the like) performs operations associated with synchronous channel access based on adaptive channel occupancy time management.

As shown in FIG. 5, in some aspects, process 500 may include identifying an LBT success time at which an LBT procedure, performed by the node, succeeds (block 510). In some aspects, the node (e.g., using receive processor 258, transmit processor 264, controller/processor 280, memory 292, and/or the like) may identify an LBT success time at which an LBT procedure, performed by the node, succeeds, as described above.

As further shown in FIG. 5, in some aspects, process 500 may include determining a lag between the LBT success time and a most recent synchronization reference boundary that occurred prior to the LBT success time (block 520). In some aspects, the node (e.g., using receive processor 258, transmit processor 264, controller/processor 280, memory 292, and/or the like) may determine a lag between the LBT success time and a most recent synchronization reference boundary that occurred prior to the LBT success time, as described above.

As further shown in FIG. 5, in some aspects, process 500 may include determining a maximum channel occupancy time (MCOT) for transmissions on an unlicensed radio frequency spectrum band based at least in part on comparing the lag and a threshold (block 530). In some aspects, the node (e.g., using receive processor 258, transmit processor 264, controller/processor 280, memory 292, and/or the like) may determine an MCOT for transmissions on an unlicensed radio frequency spectrum band based at least in part on comparing the lag and a threshold, as described above.

Process 500 may include additional aspects, such as any single aspect or any combination of aspects described below and/or in connection with one or more other processes described elsewhere herein.

In a first aspect, process 500 includes transmitting on the unlicensed radio frequency spectrum band during a time interval defined by the LBT success time and the MCOT.

In a second aspect, alone or in combination with the first aspect, if the lag satisfies the threshold, the MCOT comprises a time period that terminates at a first synchronization reference boundary occurring after the LBT success time.

In a third aspect, alone or in combination with the first aspect, if the lag does not satisfy the threshold, the MCOT comprises a time period that terminates at a second synchronization reference boundary occurring after the LBT success time.

In a fourth aspect, alone or in combination with one or more of the first through third aspects, process 500 includes receiving, from another node, an indication of a set of parameters that indicate a plurality of synchronization reference boundaries, a synchronization interval, the threshold, or a combination thereof.

In a fifth aspect, alone or in combination with one or more of the first through fourth aspects, process 500 includes determining, based at least in part on information from a geolocation database, a set of parameters that indicate a plurality of synchronization reference boundaries, a synchronization interval, the threshold, or a combination thereof.

In a sixth aspect, alone or in combination with the fifth aspect, process 500 includes transmitting, to another node, an indication of the set of parameters.

In a seventh aspect, alone or in combination with the fifth aspect, the set of parameters is indicated in system information (SI), remaining minimum system information (RMSI), a medium access control (MAC) control element (CE), or a combination thereof.

In an eighth aspect, alone or in combination with one or more of the first through seventh aspects, the threshold is fixed.

In a ninth aspect, alone or in combination with one or more of the first through seventh aspects, the threshold is variable.

In a tenth aspect, alone or in combination with the ninth aspect, the threshold comprises an initial threshold value, a modified threshold value, or a combination thereof, and the node determines the modified threshold value based at least in part on the initial threshold value and an adaptive control procedure.

In an eleventh aspect, alone or in combination with one or more of the first through tenth aspects, process 500 includes receiving, from another node, a threshold mode indication that indicates a threshold mode, of a plurality of threshold modes, to be used for determining the threshold, the plurality of threshold modes comprising a fixed threshold mode in which the threshold is fixed and a variable threshold mode in which the threshold is variable; and operating according to the indicated threshold mode.

In a twelfth aspect, alone or in combination with the eleventh aspect, the indicated threshold mode comprises the variable threshold mode, and process 500 includes dynamically modifying a value of the threshold based at least in part on an adaptive control procedure associated with a target MCOT.

In a thirteenth aspect, alone or in combination with the twelfth aspect, process 500 includes determining an estimated average MCOT; comparing the estimated average MCOT and a target MCOT; and determining a modified threshold by modifying an initial threshold based at least in part on comparing the estimated average MCOT and the target MCOT.

In a fourteenth aspect, alone or in combination with the thirteenth aspect, determining the modified threshold comprises: increasing the initial threshold by an upward step size if the estimated average MCOT is greater than the target MCOT; or decreasing the initial threshold by a downward step size if the estimated average MCOT is less than the target MCOT.

In a fifteenth aspect, alone or in combination with the fourteenth aspect, process 500 includes receiving, from another node, an indication of a set of adaptive control parameters that indicate the target MCOT, the initial threshold, the upward step size, the downward step size, or a combination thereof.

In a sixteenth aspect, alone or in combination with the fourteenth aspect, process 500 includes determining, based at least in part on information from a geolocation database, a set of adaptive control parameters that indicate the target MCOT, the initial threshold, the upward step size, the downward step size, or a combination thereof.

In a seventeenth aspect, alone or in combination with the sixteenth aspect, process 500 includes transmitting, to another node, an indication of the set of adaptive control parameters.

In an eighteenth aspect, alone or in combination with the sixteenth aspect, the set of adaptive control parameters is indicated in SI, RMSI, a MAC CE, or a combination thereof.

In a nineteenth aspect, alone or in combination with the fifteenth aspect, the modified threshold is greater than or equal to a lower boundary value.

In a twentieth aspect, alone or in combination with the nineteenth aspect, process 500 includes receiving, from another node, an indication of the lower boundary value.

In a twenty-first aspect, alone or in combination with the nineteenth aspect, process 500 includes determining, based at least in part on information from a geolocation database, the lower boundary value.

In a twenty-second aspect, alone or in combination with the twenty-first aspect, the lower boundary value is indicated in SI, RMSI, a MAC CE, or a combination thereof.

In a twenty-third aspect, alone or in combination with the twenty-first aspect, process 500 includes transmitting, to another node, an indication of the lower boundary value.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
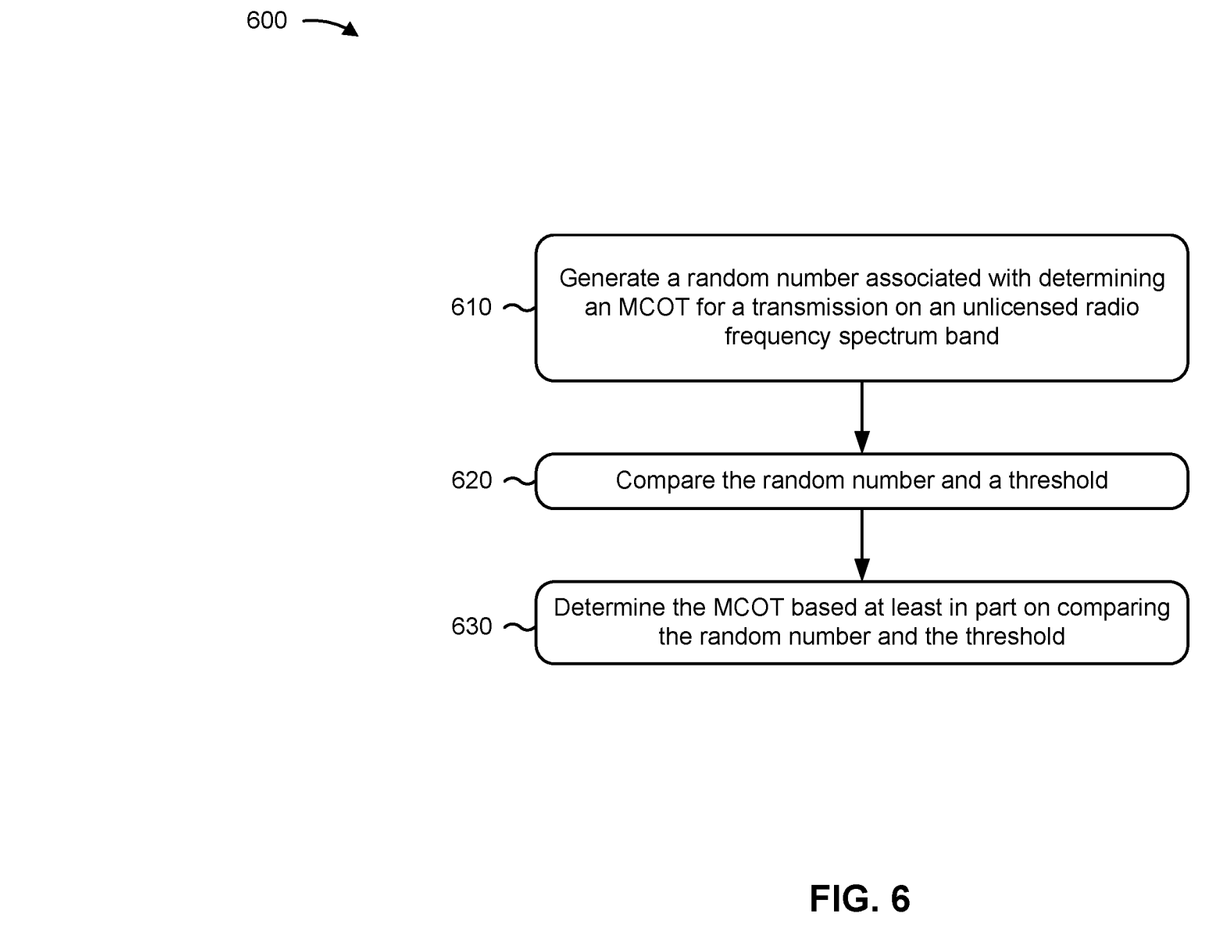
FIG. 6 is a diagram illustrating a process performed by a node, in accordance with various aspects of the present disclosure.

FIG. 6 is a diagram illustrating an example process 600 performed by a node, in accordance with various aspects of the present disclosure. Example process 600 is an example where the node (e.g., node B 404 and/or the like) performs operations associated with synchronous channel access based on adaptive channel occupancy time management.

As shown in FIG. 6, in some aspects, process 600 may include generating a random number associated with determining an MCOT for a transmission on an unlicensed radio frequency spectrum band (block 610). In some aspects, the node (e.g., using receive processor 258, transmit processor 264, controller/processor 280, memory 292, and/or the like) may generate a random number associated with determining an MCOT for a transmission on an unlicensed radio frequency spectrum band, as described above.

As further shown in FIG. 6, in some aspects, process 600 may include comparing the random number and a threshold (block 620). In some aspects, the node (e.g., using receive processor 258, transmit processor 264, controller/processor 280, memory 292, and/or the like) may compare the random number and a threshold, as described above.

As further shown in FIG. 6, in some aspects, process 600 may include determining the MCOT based at least in part on comparing the random number and the threshold (block 630). In some aspects, the node (e.g., using receive processor 258, transmit processor 264, controller/processor 280, memory 292, and/or the like) may determine the MCOT based at least in part on comparing the random number and the threshold, as described above.

Process 600 may include additional aspects, such as any single aspect or any combination of aspects described below and/or in connection with one or more other processes described elsewhere herein.

In a first aspect, process 600 includes transmitting on the unlicensed radio frequency spectrum band during a time interval defined by the LBT success time and the MCOT.

In a second aspect, alone or in combination with the first aspect, if the random number satisfies the threshold, the MCOT comprises a time period that terminates at a first synchronization reference boundary occurring after the LBT success time.

In a third aspect, alone or in combination with the first aspect, if the random number does not satisfy the threshold, the MCOT comprises a time period that terminates at a second synchronization reference boundary occurring after the LBT success time.

In a fourth aspect, alone or in combination with one or more of the first through third aspects, process 600 includes receiving, from another node, an indication of a set of parameters that indicate a plurality of synchronization reference boundaries, a synchronization interval, the threshold, or a combination thereof.

In a fifth aspect, alone or in combination with one or more of the first through fourth aspects, process 600 includes determining, based at least in part on information from a geolocation database, a set of parameters that indicate a plurality of synchronization reference boundaries, a synchronization interval, the threshold, or a combination thereof.

In a sixth aspect, alone or in combination with the fifth aspect, process 600 includes transmitting, to another node, an indication of the set of parameters.

In a seventh aspect, alone or in combination with the fifth aspect, the set of parameters is indicated in SI, RMSI, a MAC CE, or a combination thereof.

In an eighth aspect, alone or in combination with one or more of the first through seventh aspects, the threshold is fixed.

In a ninth aspect, alone or in combination with one or more of the first through seventh aspects, the threshold is variable.

In a tenth aspect, alone or in combination with one or more of the first through ninth aspects, the threshold comprises an initial threshold value, a modified threshold value, or a combination thereof, the node determines the modified threshold value based at least in part on the initial threshold value and an adaptive control procedure.

In an eleventh aspect, alone or in combination with one or more of the first through tenth aspects, process 600 includes receiving, from another node, a threshold mode indication that indicates a threshold mode, of a plurality of threshold modes, to be used for determining the threshold, the plurality of threshold modes comprising a fixed threshold mode in which the threshold is fixed and a variable threshold mode in which the threshold is variable; and operating according to the indicated threshold mode.

In a twelfth aspect, alone or in combination with the eleventh aspect, the indicated threshold mode comprises the variable threshold mode, and process 600 includes dynamically modifying a value of the threshold based at least in part on an adaptive control procedure associated with a target MCOT.

In a thirteenth aspect, alone or in combination with the twelfth aspect, process 600 includes determining an estimated average MCOT; comparing the estimated average MCOT and a target MCOT; and determining a modified threshold by modifying an initial threshold based at least in part on comparing the estimated average MCOT and the target MCOT.

In a fourteenth aspect, alone or in combination with the thirteenth aspect, determining the modified threshold comprises: increasing the initial threshold by an upward step size if the estimated average MCOT is greater than the target MCOT; or decreasing the initial threshold by a downward step size if the estimated average MCOT is less than the target MCOT.

In a fifteenth aspect, alone or in combination with the thirteenth aspect, process 600 includes receiving, from another node, an indication of a set of adaptive control parameters that indicate the target MCOT, the initial threshold, the upward step size, the downward step size, or a combination thereof.

In a sixteenth aspect, alone or in combination with the fourteenth aspect, process 600 includes determining, based at least in part on information from a geolocation database, a set of adaptive control parameters that indicate the target MCOT, the initial threshold, the upward step size, the downward step size, or a combination thereof.

In a seventeenth aspect, alone or in combination with the sixteenth aspect, process 600 includes transmitting, to another node, an indication of the set of adaptive control parameters.

In an eighteenth aspect, alone or in combination with the sixteenth aspect, the set of adaptive control parameters is indicated in SI, RMSI, a MAC CE, or a combination thereof.

In a nineteenth aspect, alone or in combination with the fifteenth aspect, the modified threshold is greater than or equal to a lower boundary value.

In a twentieth aspect, alone or in combination with the nineteenth aspect, process 600 includes receiving, from a base station, an indication of the lower boundary value.

In a twenty-first aspect, alone or in combination with the nineteenth aspect, process 600 includes determining, based at least in part on information from a geolocation database, the lower boundary value.

In a twenty-second aspect, alone or in combination with the twenty-first aspect, the lower boundary value is indicated in SI, RMSI, a MAC CE, or a combination thereof.

In a twenty-third aspect, alone or in combination with the twenty-first aspect, process 600 includes transmitting, to another node, an indication of the lower boundary value.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a node, comprising:
    identifying a listen-before-talk (LBT) success time at which an LBT procedure, performed by the node, succeeds;
    determining a lag between the LBT success time and a most recent synchronization reference boundary that occurred prior to the LBT success time; and
    determining a maximum channel occupancy time (MCOT) for transmissions on an unlicensed radio frequency spectrum band based at least in part on comparing the lag and a threshold.

2. The method of claim 1, further comprising transmitting on the unlicensed radio frequency spectrum band during a time interval defined by the LBT success time and the MCOT.

3. The method of claim 1, wherein if the lag satisfies the threshold, the MCOT comprises a time period that terminates at a first synchronization reference boundary occurring after the LBT success time.

4. The method of claim 1, wherein if the lag does not satisfy the threshold, the MCOT comprises a time period that terminates at a second synchronization reference boundary occurring after the LBT success time.

5. The method of claim 1, wherein the threshold is fixed.

6. The method of claim 1, wherein the threshold is variable.

7. The method of claim 6, wherein the threshold comprises an initial threshold value, a modified threshold value, or a combination thereof, and wherein the method further comprises determining the modified threshold value based at least in part on the initial threshold value and an adaptive control procedure.

8. The method of claim 1, further comprising:
receiving, from another node, a threshold mode indication that indicates a threshold mode, of a plurality of threshold modes, to be used for determining the threshold, the plurality of threshold modes comprising a fixed threshold mode in which the threshold is fixed and a variable threshold mode in which the threshold is variable, wherein the indicated threshold mode comprises the variable threshold mode;
dynamically modifying a value of the threshold based at least in part on an adaptive control procedure associated with a target MCOT; and
operating according to the indicated threshold mode.

9. The method of claim 1, further comprising:
determining an estimated average MCOT;
comparing the estimated average MCOT and a target MCOT; and
determining a modified threshold by modifying an initial threshold based at least in part on comparing the estimated average MCOT and the target MCOT.

10. The method of claim 9, wherein determining the modified threshold comprises:
increasing the initial threshold by an upward step size if the estimated average MCOT is greater than the target MCOT; or
decreasing the initial threshold by a downward step size if the estimated average MCOT is less than the target MCOT.

11. A node for wireless communication, comprising:
a memory; and
one or more processors operatively coupled to the memory, the one or more processors configured to:
identify a listen-before-talk (LBT) success time at which an LBT procedure, performed by the node, succeeds;
determine a lag between the LBT success time and a most recent synchronization reference boundary that occurred prior to the LBT success time; and
determine a maximum channel occupancy time (MCOT) for transmissions on an unlicensed radio frequency spectrum band based at least in part on comparing the lag and a threshold.

12. The node of claim 11, wherein the one or more processors are further configured to transmit on the unlicensed radio frequency spectrum band during a time interval defined by the LBT success time and the MCOT.

13. The node of claim 11, wherein if the lag satisfies the threshold, the MCOT comprises a time period that terminates at a first synchronization reference boundary occurring after the LBT success time.

14. The node of claim 11, wherein if the lag does not satisfy the threshold, the MCOT comprises a time period that terminates at a second synchronization reference boundary occurring after the LBT success time.

15. The node of claim 11, wherein the one or more processors are further configured to receive, from another node, an indication of a set of parameters that indicate:
a plurality of synchronization reference boundaries,
a synchronization interval,
the threshold, or
a combination thereof.

16. The node of claim 11, wherein the threshold is variable.

17. The node of claim 16, wherein the threshold comprises an initial threshold value, a modified threshold value, or a combination thereof, and wherein the one or more processors are further configured to determine the modified threshold value based at least in part on the initial threshold value and an adaptive control procedure.

18. The node of claim 11, wherein the one or more processors are further configured to:
receive, from another node, a threshold mode indication that indicates a threshold mode, of a plurality of threshold modes, to be used for determining the threshold, the plurality of threshold modes comprising a fixed threshold mode in which the threshold is fixed and a variable threshold mode in which the threshold is variable, wherein the indicated threshold mode comprises the variable threshold mode;
modify a value of the threshold based at least in part on an adaptive control procedure associated with a target MCOT; and
operate according to the indicated threshold mode.

19. The node of claim 11, wherein the one or more processors are further configured to:
determine an estimated average MCOT;
compare the estimated average MCOT and a target MCOT; and
determine a modified threshold by modifying an initial threshold based at least in part on comparing the estimated average MCOT and the target MCOT.

20. The node of claim 19, wherein the one or more processors, to determine the modified threshold, are configured to
increase the initial threshold by an upward step size if the estimated average MCOT is greater than the target MCOT; or
decrease the initial threshold by a downward step size if the estimated average MCOT is less than the target MCOT.

* * * * *